UNITED STATES PATENT OFFICE 2,581,120

RUST INHIBITING COMPOSITION

Alfred H. Matuszak, Jersey City, N. J., assignor to Standard Oil Development Company, a corporation of Delaware No Drawing. Application May 5, 1948, Serial No. 25,309

8 Claims. (Cl. 252—51.5)

This invention relates to rust preventing oil compositions and more particularly to mineral lubricating oil compositions which tend to inhibit rusting and corrosion of metal parts which are exposed to moisture.

A primary object of the present invention is the preparation of compositions which may be employed as internal combustion engine lubricants and which will also serve for the protection of exposed surfaces of such engines when the same are not in use. When operating engines in climates having a high humidity, rusting begins within a very short period of time after the engine is shut down. The compositions of the present invention are particularly valuable in preventing such rusting and they are valuable not only in the lubrication of internal combustion engines, but with oil bases of suitable viscosity they may be employed as turbine oils or as lubricants for firearms, ordnance equipment, industrial machinery, etc., and in fact for any lubricating purposes where metal surfaces are exposed to humid air.

The corrosion preventing compositions of the present invention are formed by adding to a suitable oil base an additive which is formed by partially esterifying a nitroalcohol which preferably has the composition

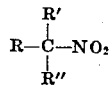

where R is an alkyl group of 1 to 6 carbon atoms, to which is attached at least one hydroxyl group, preferably at the carbon atom adjacent to the carbon atom linked to the nitro group, and R' and R" each represent hydrogen or an alkyl group of 1 to 6 carbon atoms, which may have attached one or more hydroxyl groups. The esterification is brought about by esterifying the nitroalcohol with a carboxylic acid containing from 6 to 24 carbon atoms per molecule. Such acid may be aliphatic or cycloaliphatic and if aliphatic may contain a straight or branched chain. The acid may be saturated or unsaturated and may contain one, two, or more carboxyl groups. It is desirable to form a partial ester, leaving at least one free hydroxyl group in the molecule.

The nitroalcohols employed in the preparation of the preferred additives of the present invention may be conveniently prepared by reacting a nitroparaffin with an aldehyde in the presence of an alkali catalyst. Alcohol or water may be used as a solvent. The nitroalcohol obtained will be dependent on the temperature and the mol ratio of the reactants employed.

Particularly suitable acids which may be employed in the formation of the esters of the present invention are lauric, palmitic, stearic, oleic, lineoleic, ricinoleic, eleomargic, erucic, behenic, arachidic, lignoceric, and other fatty acids, also the naphthenic acids, as well as carboxylic acids derived by the oxidation of petroleum products. Naturally occurring products or acids derived therefrom, such as tall oil, castor oil, soybean oil, linseed oil, olive oil, tung oil, rapeseed oil, menhaden oil and the like, may conveniently be employed.

The desired partial esters may be conveniently prepared by reacting the nitroalcohol with a suitable acid halide, acid anhydride, or acid at a somewhat elevated temperature, using preferably a conventional esterification catalyst, such, for example, as zinc chloride, p-toluene-sulfonic acid, sulfuric acid, sulfosalicylic acid or the like. The temperature of the reaction should not be much above about 175° C., since at higher temperatures the nitro group of the alcohol tends to decompose. In reacting the nitroalcohol with an acid, the reaction may suitably be carried out by refluxing a toluene solution of the reactants, and in such case refluxing will take place at about 120° C., the exact temperature depending upon the amount of toluene employed. When an acid halide is employed as a reactant, somewhat lower temperatures may be employed.

Some of the more preferred examples of the partial esters of nitroalcohols, useful in accordance with this invention and readily prepared by the methods described, are the oleic acid partial esters of tris-(hydroxymethyl)-nitromethane, 2-methyl-2-nitro-1,3-propanediol, tris-(1-hydroxyethyl)-nitromethane, 3-methyl-3-nitro-2,4-pentanediol, tris-(1,3-dihydroxybutyl)-nitromethane, 5-methyl-5-nitro-2,4,6,8-tetrahydroxynonane.

The additives of the present invention may be advantageously employed with petroleum fractions of a wide variety, although their preferred use is in lubricating oil bases to form lubricant compositions which also act as corrosion preventives. The base stocks may be derived from various types of crude petroleum and may consist of distillates or blends of various kinds which have been refined by any of the conventional methods. Synthetic oils may also be used such as those obtained by the polymerization of olefins or by the hydrogenation of coal or its products. In the case of lubricants the base stock chosen will normally be that oil which without the new additives gives the optimum performance in the service contemplated. The base oils may vary considerably in viscosity and other properties depending upon the particular use for which they are desired. For crankcase use they usually range from about 40 to 130 seconds viscosity Saybolt at 210° F. The viscosity index may range from less than 0 to 100 or even higher. Turbine oils usually have a viscosity of 40 to 60 seconds Saybolt at 210° F. Corrosion preventing compositions other than lubricating oils may comprise base stocks of a wide variety with respect to viscosity and may consist of mixtures of base stocks, as in slushing oils, which may consist of a mixture of naphtha and lubricating oil and may contain small amounts of petrolatum or a fatty compound such as degras.

In addition to the materials to be added to the base stock according to the present invention, other agents may be present in lubricating compositions and other corrosion preventing compositions such as heat thickened fatty oils, sulfurized oils, organo-metallic compounds, metallic or other soaps, sludge dispersers, antioxidants, thickeners, viscosity index improvers, oiliness agents, resins, olefin polymers and colloidal solids, such as graphite or zinc oxide. Solvents and assisting agents such as esters, ketones, alcohols, aldehydes, halogenated and nitrated compounds and the like may also be employed.

For the purpose of the present invention the esters described herein are added to the base stock in proportions preferably ranging from 0.01% to 10% by weight, and in some cases larger proportions than those specified may be employed to advantage.

The following examples illustrate the application of the present invention to lubricant suitable for use in an airplane engine, but these examples are not to be construed as limiting the scope of the invention in any way.

EXAMPLE 1

To a 1-liter flask equipped with a stirrer, thermometer, nitrogen inlet tube, and a reflux condenser fitted with water separator was added 75.6 g. (0.5 mol) of tris-(hydroxymethyl)-nitromethane, 141.3 g. (0.5 mol) of oleic acid, 250 g. of toluene and 2 g. of sulfosalicylic acid catalyst. The reaction mixture was refluxed under a nitrogen atmosphere at 116° C. for six hours during which time 9 g. (0.5 mol) of watery distillate was collected in the water receiver. The toluene solution of the ester was filtered from a small amount of unreacted tris-(hydroxymethyl)-nitromethane and then heated under reduced pressure to remove the solvent.

This ester product was then evaluated for its rust inhibiting properties by employing it in a concentration of 1% by weight in a phenol extracted Mid-Continent lubricating oil base of 120 seconds viscosity Saybolt at 210° F. which was used as a crankcase oil in a single cylinder air cooled aviation type engine of 5.7 H. P. at 2400 R. P. M. speed, manufactured by the Wisconsin Motor Corporation. The engine was operated on 91 grade aviation gasoline containing 4 cc. tetraethyl lead per gallon. After running the engine for eight hours with this test oil, the stainless steel cylinder which has the same composition as the cylinders of a full scale airplane engine, such as a Pratt and Whitney R1340 engine, was removed and stored in a humidity cabinet in which the temperature was caused to vary between 72° and 90° F. and the relative humidity between 94% and 53% during each 24 hour period. Typical conditions in a tropical climate were thus simulated. After each day the amount of rust present on the cylinder wall was observed and the storage period continued until a test period of five days had been completed. A similar test was conducted by employing the same base oil without a rust inhibitor as the crankcase lubricant and similarly storing the cylinder in the humidity cabinet. The observations of the conditions of the cylinder are given in the following tables:

*Cylinder rusting test*

[Per cent of cylinder wall rusted.]

|  | Days of storage | | | | |
|---|---|---|---|---|---|
|  | 1 | 2 | 3 | 4 | 5 |
| Uninhibited Oil | 5 | 10 | 15 | 22 | 30 |
| Same+1% Ester | 2 | 4 | 5 | 7 | 8 |

EXAMPLE 2

To 37.8 g. (0.25 mol) of tris-(hydroxymethyl)-nitromethane and 200 g. of pyridine in the same equipment as that described in Example 1 was added dropwise through a separatory funnel 75.2 g. (0.25 mol) of oleyl chloride over a period of 30 minutes. The mixture was then refluxed at 122° C. for 30 minutes to complete the reaction. The pyridine was then distilled off at reduced pressure (12 mm. of mercury) and the ester dissolved in 275 g. of toluene. The toluene solution was thoroughly washed with water and sodium bicarbonate solution to remove the pyridine hydrochloride and thereafter was heated at 115° C. under reduced pressure (19 mm.) to remove the toluene.

A 1% blend of this ester in the same base oil as that employed in the test described in Example 1 was evaluated as to its rust inhibiting properties by employing the same in an engine and storing the cylinder in the humidity cabinet according to the method described above. The observations of the condition of the cylinder are given in the following table:

*Cylinder rusting test*

[Per cent of cylinder wall rusted.]

|  | Days of Storage | | | | |
|---|---|---|---|---|---|
|  | 1 | 2 | 3 | 4 | 5 |
| Uninhibited Oil | 5 | 10 | 15 | 22 | 30 |
| Same+1% Ester | 7 | 10 | 12 | 12 | 12 |

EXAMPLE 3

To 33.8 g. (0.25 mol) of 2-methyl-2-nitro-1,3-propanediol and 150 g. of pyridine in the same equipment as that described in Example 1 was added dropwise through a separatory funnel 75.2 g. (0.25 mol) of oleyl chloride over a period of 15 minutes, during which time the temperature rose to 55° C. The temperature was then raised to 80° C. and held at this point for one hour, after which the temperature was further raised to 122° C. for five minutes. The pyridine was distilled off at reduced pressure (12 mm.) and the ester dissolved in 250 g. toluene. This toluene solution was washed with water and sodium bicarbonate solution to remove the pyridine hydrochloride and heated at 115° C. under 20 mm. pressure to remove the toluene, leaving an amber colored viscous liquid product.

A 1% solution of this ester in a base oil of the type described in previous examples was evaluated for rust inhibiting properties in the manner described in Example 1. The observations on the conditions on the cylinder are given in the following table:

*Cylinder rusting test*

[Per cent of cylinder wall rusted.]

|  | Days of Storage | | | | |
|---|---|---|---|---|---|
|  | 1 | 2 | 3 | 4 | 5 |
| Uninhibited Oil | 5 | 10 | 15 | 22 | 30 |
| Same+1% Ester | 18 | 20 | 20 | 20 | 20 |

The invention is not to be considered as limited by any of the examples described or disclosed herein, which are given by way of illustration only, but is to be limited solely by the terms of the appended claims.

What is claimed is:

1. A composition consisting essentially of a hydrocarbon solvent containing dissolved therein 0.01% to 10% of a partial ester of a nitroalcohol of the formula

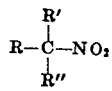

where R is an alkyl group of 1 to 6 carbon atoms to which is attached at least one hydroxyl group, one of such hydroxyl groups being attached to the carbon atom which is adjacent to the C—NO$_2$ group and R' and R'' each represent a member of a group consisting of hydrogen, alkyl groups of 1 to 6 carbon atoms, and alkyl groups of 1 to 6 carbon atoms having attached thereto at least one hydroxyl group, one of such hydroxyl groups being attached to the carbon atom which is adjacent to the C—NO$_2$ group said partial ester being derived from a carboxylic acid containing from 6 to 24 carbon atoms per molecule and selected from the group consisting of aliphatic and cycloaliphatic acids.

2. A composition according to claim 1 in which the hydrocarbon solvent is a mineral lubricating oil.

3. A composition according to claim 1 in which the carboxylic acid is oleic acid.

4. A composition according to claim 1 in which the nitroalcohol is tris-(hydroxymethyl)-nitromethane.

5. A composition according to claim 1 in which the nitroalcohol is 2-methyl-2-nitro-1,3-propanediol.

6. A composition consisting essentially of a mineral lubricating oil containing dissolved therein 0.01% to 10% of an oleic acid partial ester of tris-(hydroxymethyl)-nitromethane.

7. A composition consisting essentially of a mineral lubricating oil containing dissolved therein 0.01% to 10% of tris-(hydroxymethyl)-nitromethane having one hydroxyl group esterified by an oleic acid radical.

8. A composition consisting essentially of a mineral lubricating oil containing dissolved therein a 0.01% to 10% of an oleic acid partial ester of 2-methyl-2-nitro-1,3 propanediol.

ALFRED H. MATUSZAK.

REFERENCES CITED

The following references are of record in the file of this patent:

UNITED STATES PATENTS

| Number | Name | Date |
|---|---|---|
| 2,371,333 | Johnston | Mar. 13, 1945 |
| 2,402,487 | Batchelder | June 18, 1946 |
| 2,411,593 | Routson | Nov. 26, 1946 |
| 2,427,821 | Tindall | Sept. 23, 1947 |